April 18, 1944.     J. P. JOHNSON     2,346,761
HYDRAULIC GEAR PUMP
Filed April 25, 1940

INVENTOR.
JAMES P. JOHNSON
BY O. Melbourne Green
ATTORNEY.

Patented Apr. 18, 1944

2,346,761

UNITED STATES PATENT OFFICE 2,346,761

HYDRAULIC GEAR PUMP

James P. Johnson, Shaker Heights, Ohio

Application April 25, 1940, Serial No. 331,584

8 Claims. (Cl. 103—126)

This invention relates to hydraulic pumps and more particularly to the gear type, embodying certain improvements which make it particularly adaptable for use on aircraft.

The particular uses for hydraulic gear pumps on aircraft and the like, are well known to those skilled in the art and the pump embodying the present invention is to correct certain objectionable features which will increase efficiency in operation and materially reduce the weight without any reduction in the relative displacement of the pump.

The pump embodying the present invention is intended for use where high pressures are required, usually above 200 pounds per square inch, and the operating speed runs from 1000 R. P. M. upwardly which adapts the pump exceptionally well for use in the operation of landing gears, flaps, etc., by affording a wide pressure range regardless of engine speeds.

It is, therefore, an object of the present invention to provide an improved high pressure gear pump of light weight, compact construction, more efficient in operation, and adapted to develop and operate under whatever pressure is desired.

Another object of the present invention is to provide cooperating bushing members in which the gears are enclosed and so disposed relatively that interference with the free operation of the gears is prevented thus increasing the efficiency and reducing seizure and fracture to a minimum.

Another object of the present invention is to provide means for restricting the fluid outlet opening communicating with the interior of the pump chamber thereby reducing to a minimum any destructive effect upon the pump gears caused by the high pressure of the fluid stored in the outlet port and lines.

Another object of the present invention is to provide a fluid pump of the type referred which is capable of operation in either direction by so mounting the improved parts that a relative disposition of 180 degrees is required without the necessity of removing that part of the housing connected to its supporting structure.

Another object of the present invention is to provide a pump which is simple in construction, light in weight, and inexpensive to manufacture and assemble.

With the objects above indicated, and other objects hereinafter explained in view, my invention consists in the construction and combination of elements hereinafter described and claimed.

Referring to the drawing.

Figure 1:
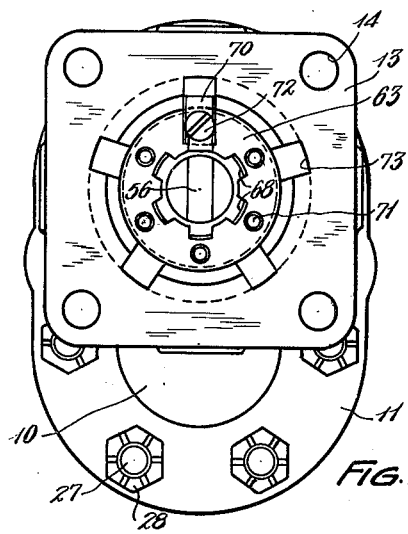
Figure 1 is an end elevational view of a pump embodying the present invention and showing the mounting flange by which the pump is connected to any suitable supporting structure.

In the drawing, I have illustrated one type of gear pump embodying the present invention but its specific application is not to be limited thereto inasmuch as the invention has other adaptations well recognized by those skilled in the particular art. Referring now to the illustrations, the pump comprises a housing 10, preferably an aluminum casting or any other suitable light weight material having similar characteristics, and one end of which is provided with a laterally extending integral flange 11 of elongated section as more clearly shown in Figure 1. The housing 10 is further provided with an integral extension 12 projecting laterally outwardly from the flange 11 and has a laterally extending flange 13 formed integral at its outer end opposite the flange 11, the flanges being disposed relatively in parallel spaced relation. The flange 13 is substantially square in transverse section and has an annular projection 13' projecting axially outwardly therefrom for a purpose to be later described. The flange 13 is further provided with a plurality of openings 14 spaced adjacent the corners thereof which extend through the flange and provides means by which the pump housing may be attached to a suitable supporting structure in a well known manner.

The flange 11 of the housing 10 has a smooth flat outer face 15 and a pair of circular bores 16 and 17 respectively extend inwardly from the face 15, being spaced apart relatively so that their axes are in parallel relation and in a common transverse plane. A pair of bushings 18 and 19, of bronze or any other suitable material, have annular portions 18'—19' securely disposed within the bores 16 and 17 respectively and laterally extending circular flanges 20 and 21 which project outwardly beyond the face 15 but in engagement therewith and terminate inwardly from the marginal edge of the flange. The flanges 20 and 21 of the bushings 18 and 19 are of such relative diameter that they would ordinarily overlap and so that they may be disposed in the same transverse plane the overlapping portions are cut-off to provide flat engaging faces 22, as more clearly shown in Figures 2 and 3. It will be obvious also that these engaging faces 22 further function to prevent relative rotation of the bushings.

A cover member 23, preferably an aluminum casting or of other suitable material, is provided for enclosing the open end of the housing and has a laterally extending flange 24 at its inner end of substantially the same contour as that of the flange 11. The flange 24 of the cover member 23 has a flat smooth outer face 25 disposed in cooperative engagement with the adjacent face 15 of the flange 11 and a gasket 26 is disposed between the adjacent faces to provide a fluid tight joint. The cover member 23 is further provided with a plurality of studs 27 having their inner ends secured within the cover member and their outer ends projecting through aligned openings provided in the flange 11 of the housing. The studs are spaced apart in angular relative relation and have their outer ends screw-threaded to receive nuts 28 by means of which the cover member 23 is removably connected to the housing. Lock washers 29 may be disposed between the nuts 28 and the adjacent face of the housing to prevent accidental removal.

Figure 2:
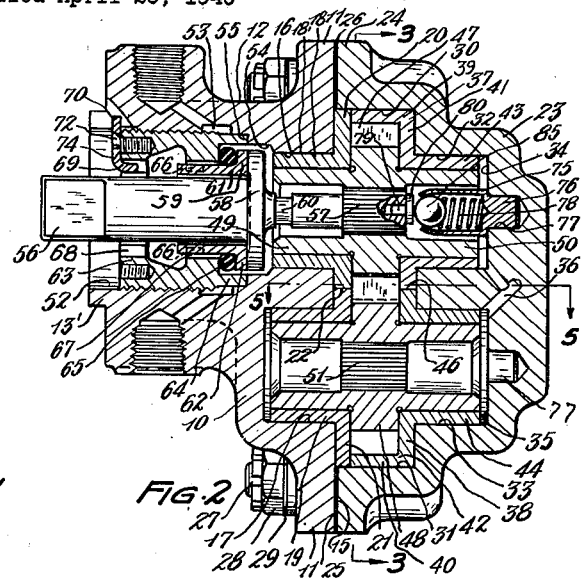
Figure 2 is a longitudinal vertical sectional view of the pump and showing structural details embodying the invention.

The cover member 23 is further provided with a pair of circular bores 30 and 31 respectively extending inwardly from the face 25 and of such diameter and relative disposition as to snugly encompass the outer peripheral surfaces of the adjacent flanges 20 and 21 on the bushings 18 and 19 as more clearly shown in Figure 2. The bores 30 and 31 communicate respectively with a pair of bores 32 and 33 of relatively smaller diameter which extend further inwardly from the face 25 and are of the same diameter and in relative axial alignment with the bores 16 and 17 in the housing 10. The bores 32 and 33 terminate inwardly from the outer end of the cover member 23 to provide bottom walls 34 and 35 and a passageway 36 extends through the end of the cover member and connects the bores 32 and 33 to afford communication therebetween for a purpose to be later described.

A pair of bushings 37 and 38, of bronze or other suitable material, have annular portions 39 and 40 securely mounted on the inner peripheral walls of the respective bores 30 and 31, the outer ends terminating short of the face 25 and adapted for abutment with the adjacent face of the flanges 20 and 21. The bushings are further provided respectively with laterally extending circular flanges 41 and 42 adapted for abutment with the bottom walls of the bores 30 and 31 and annular extending portions 43 and 44 snugly disposed within the respective bores 32 and 33 and in axial alignment with the annular portions 18'—19' on the bushings 18 and 19. The inner adjacent portions of the bushing flanges 41 and 42 are cut away so as to provide engaging faces 46 for the same purpose as heretofore explained in connection with the engaging faces 22. The relative positioning of the bushing members as described and with the outer ends of the annular portions 39 and 40 respectively abutting the inner adjacent faces of the bushing flange members 20 and 21 affords a construction in which any relative unequal movement of the bushing members is prevented thus eliminating the possibility of engagement with the pump gears to an extent which might otherwise cause seizure and fracture of the driving member, the details of which will be hereinafter described. While the preferred arrangement of the cooperating bushings is herein illustrated it is obvious that other arrangements may be utilized when the improved result is desired. By adopting this type of bushing a very good grade of bronze can be used and all of the disadvantages resulting where high molten temperatures are required to effect fusion between the bronze inserts and the aluminum casting are eliminated.

Figure 3:
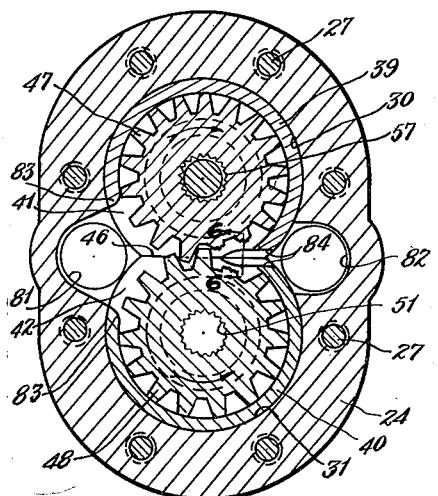
Figure 3 is a transverse sectional view taken substantially along the line 3—3 in Figure 2 and showing details of the pumping chamber and gears.
Figure 4:
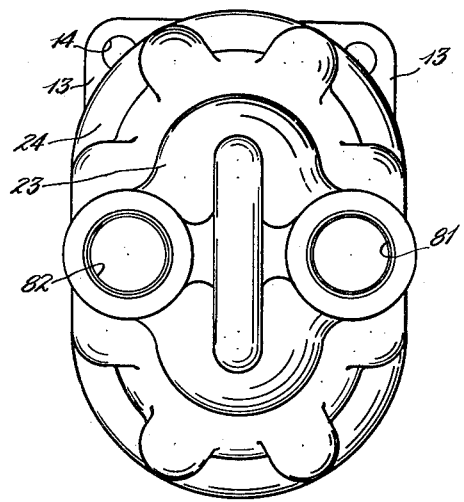
Figure 4 is an end elevational view of the pump and showing the relative position of the fluid inlet and outlet openings.
Figure 5:
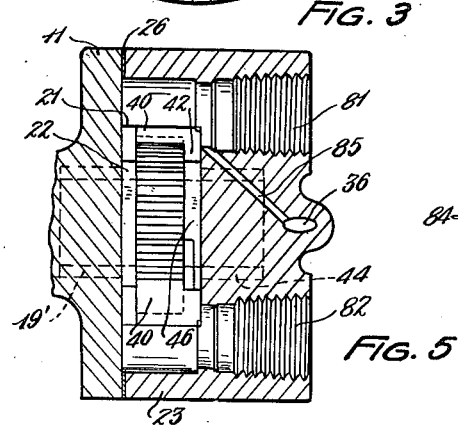
Figure 5 is a fragmentary transverse sectional view taken substantially along the line 5—5 in Figure 2 and showing further details of the bushings forming the pumping chamber.
Figure 6:
Figure 6 is a fragmentary sectional view taken substantially along the line 6—6 in Figure 3 and showing the preferred means for restricting the fluid outlet opening.

As will be apparent by reference to Figures 2, 3 and 5, a pair of externally meshing gears 47 and 48 are rotatably disposed within the enclosed pump chamber formed by relative cooperation of the flanges 20 and 21 on the bushing members 18 and 19 respectively and the annular portions 39 and 40 and lateral flanges 41 and 42 on the bushing members 37 and 38 respectively, the gears being in constant meshing engagement adjacent the engaging faces 22 and 46 between which communication is provided. The diameter of the gears 47 and 48 and the longitudinal length of the gear teeth are such as to closely fit the adjacent surfaces of the bushing members so that fluid is efficiently pumped in a manner to be later described. The gears are of identical size and construction to afford interchangeability and each gear is provided with a pair of annular projections 49 and 50 extending axially outwardly on diametrically opposite sides and being rotatably mounted in the adjacent annular portions 18' and 43 on the respective bushings 18 and 37. Each gear is further provided with an axial opening internally splined at 51 which affords communication between the annular projections 49 and 50.

One of said gears is positively driven from an external source through any suitable means but preferably a simple and effective construction consists in providing a bore 52 which extends axially inwardly from the flange 13 and communicates with the bore 16 provided in the flange 11. The bore 52 is of larger diameter at its outer end than the bore 16 and is interiorly screw-threaded for a greater portion of its length. A circumferentially extending groove 53 is formed at the inner end of the bore 52 beyond the screw-threads and is provided to receive oil in a manner later described. Beyond the groove the bore communicates with a circular bore 54 of smaller diameter thus providing a seat or shoulder 55 which bore communicates with the bore 16 provided in the flange 11.

A drive shaft 56, of steel or other suitable material, extends centrally through the bore 52 and has a reduced end portion 57 provided with external splines which slidably fit within the internally splined opening 51 in the gear 47 in such a manner as to permit slight independent axial movement of the shaft but prevents relative independent rotation with respect to the gear. The drive shaft 56 is further provided with a laterally extending circular flange 58 disposed for rotation within the adjacent bore 54 and has its outer face machined smoothly at 59 to provide a seal face. The shaft 56 is further provided with a portion 60 of greatly reduced diameter and disposed between the flange 58 and the splined end 57 to provide a weakened portion subject to breakage in the event that the gears are overloaded beyond their normal requirements.

A bronze sleeve 61 is loosely mounted upon the shaft 56 and has a laterally extending circular flange 62 at its inner end, the inner face of which is smoothly finished to provide a seal face constantly in engagement with the adjacent seal face on the flange 58. A plug 63 is exteriorly screwthreaded and insertable in the screwthreaded portion of the bore 52 and has a circular opening within which the drive shaft 56 is rotatably disposed. The inner end of the plug 63 is provided with an annular extension 64 projecting beyond the recess 53 and having its inner end abutting the shoulder 55 formed at the bottom of the bore 52. A flexible resilient ring 65, preferably of Duprene and rubber material, is disposed within the space between the outer face of the flange 62 and the bottom of the plug, the latter affording a rigid abutment for the ring. This construction affords a yieldable abutment for the flange 62 and, due to the fact that the sleeve 61 is loosely mounted upon the drive shaft, the sealing face of the flange 62 can at all times adapt itself to any angular disposition which the flange 58 on the drive shaft may assume without affecting its sealing characteristics. The sleeve 61 is prevented from rotation on the drive shaft by means of a pair of tongues 66 constituting extensions of the body of the sleeve and are positioned on diametrically opposite sides, they being positioned for sliding movement within a pair of grooves 67 cut in the adjacent portion of the plug 63. The plug 63 at its front end is provided with a plurality of slots 68 centrally disposed and spaced apart angularly about its axis and are adapted to selectively receive the end 69 of a locking plate 70. The plug 63 is further provided with a plurality of tapped openings 71 positioned in angular alignment with the slots 68 but outwardly therefrom and the locking plate 70 has an opening for selective alignment with the tapped openings 71. A screw 72 secures the locking plate in proper position in any of the selected slots 73. The attaching flange 13 is provided with a plurality of slots 73 angularly spaced apart relatively about the axis of the shaft and these slots are likewise selectively adapted to receive the plate 70. There are preferably a different number of slots 73 in the attaching flange than the number of slots 68 in the plug. The outer end of the drive shaft 56 projects beyond the attaching flange 13 and has a flattened end 74 adapted for connection with any suitable power driving means.

When the pump is operating the pressure created by the fluid therein will cause an outward movement of the circular flange 58 and effectively maintain a fluid tight seal between its seal face and the seal face of the sleeve 61 but it is desirable to normally effect a seal when the pump is not in operation or when it has just begun to operate. Any suitable means may be provided for effecting this normal pressure seal but a simple and expedient arrangement is illustrated in Figure 2 of the drawing. A tubular shell 75 is disposed in spaced relation within the annular projection 50 on the drive gear 47 and has an axial projection 76 removably disposed in a bore 77 formed on the inner side of the end wall of the cover member 23. A coil spring 78 is positioned within the tubular member 75 and has one end in abutment with the bottom of the shell. A ball is freely mounted in the outer end of the tubular shell and is held against removal by spinning over its outer free end. The upper end of the coil spring engages the ball and exerts an outward pressure thereon. The splined end 57 of the drive shaft is provided with an axial opening to receive a pin 79 formed on a thrust plate 80 which abuts with the adjacent end of the shaft. The ball and thrust plate are adapted for engagement and inasmuch as the thrust plate abuts the end of the drive shaft the latter is urged outwardly and normally effects a sealing engagement between the contacting faces of the flange 58 and sleeve flange 62. A similar bore 77 is formed in the inner face of the end wall of the cover member 23 in axial alignment with the splined opening 51 on the driven gear 48 for a purpose to be later described.

The cover member 23 is provided with a tapped inlet opening 81 and a tapped outlet opening 82, the details of which are more clearly shown in Figures 3 and 5. The inlet opening 81 communicates with the interior of the pump chamber by cutting away at a wide angle the adjacent portions, indicated by 83, of the annular portions 39 and 40 on the bushings 37 and 38 respectively so as to permit free and unrestricted flow of the incoming fluid. The outlet opening 82 is placed in communication with the interior of the pump chamber by cutting away, as indicated at 84, at a very small angle the opposite adjacent annular portions 39 and 40 of the bushings 37 and 38 respectively. By thus restricting the size of the fluid outlet opening a decided advantage is obtained in preventing ill effects from back pressure when occurring in the outlet line thus reducing to a minimum any destructive effect upon the pump gears and in rendering the pump more efficient where high operating pressures are desired. While the restricted outlet opening is shown in the preferred arrangement it is obvious that it may be otherwise located and of different sizes to suit conditions. It also restrains pulsations to a minimum thus providing a smooth and quick operating pump.

Due to the tremendous pressure created within the pump by reason of the size of the pump gears and through rotation at high speeds, it would be unsafe if a means were not provided for by-passing some of the fluid to the inlet side of the pump and to insure such by-passing of the fluid the passageway 36 communicating with the bores 32 and 33 respectively in the cover member 23 is provided. It will be obvious that the fluid drawn into the pump chamber will be forced under pressure into every free space in the housing including the inside of the gear extensions and the splined connecting openings 51. The fluid will therefore flow into the communicating bores 32 and 33 and into the passageway 36 the latter being connected by a passageway 85 with the inlet opening 81 as more clearly shown in Figure 5. This assures against damage or injury to the pump elements which is of vital importance.

By forming the attaching flange 13 directly upon the pump housing 10 a great saving in weight and overall size is effected which is a material condition in aircraft construction. By forming the drive and driven gears of identical construction simplifies assembly and lowers production cost and replacements.

In the operation of the pump when the drive shaft 56 is rotated in a clockwise direction, as viewed in Figure 1, the driven gear 47 will be rotated in the direction indicated by the arrow in Figure 3 while the driven gear 48 will be rotated in the opposite direction or as indicated by the arrow in the same figure. Fluid, such as oil, will be drawn in through the inlet opening 81, due to the reduced pressure caused by the rapid rotation of the pump gears and will be carried around by each gear toward the outlet opening. The fluid will be discharged through the restricted opening 84 at high pressure and flow into the outlet opening 82 from where by a suitable conduit, not shown, connected to the tapped outlet opening 82 it will be conveyed to the instrumentality which is to be actuated by fluid pressure. The arrangement of the various parts illustrated in the views adapts the pump for operation in one direction only as indicated by the arrows, but the pump may be adapted for operation in a reverse direction by merely removing the cover member turning it at 180 degrees and then replacing the same. In this reversed arrangement the spring pressed ball 85 must be located as shown in the present figures and for this reason the bore 77 at the lower portion of the cover member 23 is provided.

While I have described the preferred embodiment of the invention it is to be understood that I am not to be limited thereto inasmuch as changes and modifications may be resorted to without departing from the spirit of the invention as defined in the appended claims.

What is claimed is:

1. In a gear pump, a housing comprising separable cooperating sections detachably connected together, one of said sections having a pair of bores extending inwardly from its inner face, said bores being spaced apart relatively and having their axes disposed in parallelism in a common transverse plane; a pair of bushing members having annular portions fitted in said bores and laterally extending integral flanges outwardly disposed in abutment with the inner adjacent face of said section; the other of said sections having a pair of spaced bores extending inwardly from its inner face, said bores being of the same general outline as the adjacent peripheral surfaces of said flanges for snugly enclosing the latter, said last mentioned bores communicating with a pair of bores of relatively smaller diameter disposed axially inwardly to provide a transverse surface disposed in substantially parallel spaced relation with respect to the inner face of said last mentioned section, said bores of smaller diameter being disposed in relative axial alignment with the bores formed in said first mentioned section; a second pair of bushing members having outer annular portions fitted in the first mentioned bores in said second mentioned section and with their outer edges in abutment with the adjacent marginal portions of said lateral flanges, said last mentioned bushings being further provided with intermediate integral lateral flange portions in abutment with the adjacent transverse surface on said second mentioned section and disposed in substantially parallel spaced relation with respect to said lateral flanges to provide an enclosed substantially non-collapsible pump chamber, said last mentioned bushings being further provided with integral inner annular portions fitted within the bores of smaller diameter in said second mentioned section, at least one of said last mentioned bushings being provided with a fluid inlet opening at one side thereof communicating with said pump chamber and a fluid outlet opening on the other side thereof communicating with said pump chamber; a pair of pump gears rotatably disposed in the pump chamber and drivingly interconnected, said gears being provided with projections extending axially outwardly on diametrically opposite sides which are rotatably mounted in the adjacent axially aligned annular portions on said bushing members; one of said sections having a fluid passageway communicating with said inlet opening and a fluid outlet passageway communicating with said outlet opening; and a drive shaft rotatably mounted in one of said sections and having one end drivingly connected to one of said pump gears for rotating the latter whereby fluid is drawn into said inlet opening and discharged under pressure from said outlet opening.

2. A gear pump comprising a housing having a pair of bores extending inwardly from one face thereof, said bores being spaced apart relatively and having their axes disposed in parallelism in a common transverse plane; a pair of bushing members having annular portions fitted in said bores and laterally extending integral flanges outwardly disposed in abutment with the adjacent face of said housing; a cover member removably mounted on the bushing end of said housing and having a pair of spaced bores extending inwardly from its inner face, said bores being of the same general outline as the adjacent peripheral surfaces of said lateral flanges for snugly enclosing the latter, said last mentioned bores communicating with a pair of bores of relatively smaller diameter disposed axially inwardly to provide a transverse surface disposed in substantially parallel spaced relation with respect to the inner face of said cover member, said bores of smaller diameter being disposed in relative axial alignment with the bores formed in said housing; a second pair of bushing members having outer annular portions fitted in the first mentioned bores in said cover member and with their outer edges in abutment with the adjacent marginal portions of said lateral flanges, said bushings being further provided with intermediate integral lateral flange portions in abutment with the adjacent transverse surface of said cover member and disposed in substantially parallel spaced relation with respect to said lateral flanges to provide an enclosed substantially non-collapsible pump chamber, said bushings being further provided with integral inner annular portions fitted within the bores of smaller diameter in said cover member, said outer annular portions being formed with adjacent cooperating openings of relatively large size on one side of the pump chamber to permit the flow of introduced fluid into the latter, said outer annular portions being further provided with adjacent cooperating openings of relatively small size on the opposite side of the pump chamber to permit flow of the discharged fluid from the latter; a pair of pump gears rotatably disposed in said pump chamber and drivingly interconnected, said gears being provided with projections extending axially outwardly on diametrically opposite sides which are rotatably mounted in the adjacent axially aligned annular portions on said bushing members; said cover member having a fluid inlet passageway communicating with the cooperating openings of relatively large size and a fluid outlet passageway communicating with the cooperating openings of relatively small size; a drive shaft rotatably mounted in said housing and having one end drivingly connected to one of said pump gears for rotating the latter whereby fluid is drawn into said inlet opening and discharged under pressure from said outlet opening, said outlet opening being sufficiently small to reduce to a minimum any power loss resulting from high back pressure in the outlet passageway of said pump, said shaft having slight axial and angular movement independently of said gear and provided with a circumferentially extending integral flange the outer side of which is formed with a seal face; a sleeve freely disposed about said shaft and having a laterally extending flange the inner side of which is formed with a seal face engageable with the seal face on said shaft flange to provide a seal therebetween; cooperating means on said sleeve and the adjacent portion of said housing affording slight axial and angular movement of said sleeve; and a flexible resilient ring encircling said sleeve and in engagement with the outer side of said sleeve flange and the adjacent relatively stationary portion of said housing, said ring being yieldable to compensate for any slight misalignment of said drive shaft without affecting the efficiency of said seal, the pressure of the fluid within the pump during operation of said pump gears urging said shaft flange into sealing engagement with said sleeve flange.

3. A gear pump comprising a housing having a pair of bores extending inwardly from one face thereof, said bores being spaced apart relatively and having their axes disposed in parallelism in a common transverse plane; a pair of bushing members having annular portions fitted in said bores and laterally extending integral flanges outwardly disposed in abutment with the adjacent face of said housing; a cover member removably mounted on the bushing end of said housing and having a pair of spaced bores extending inwardly from its inner face, said bores being of the same general outline as the adjacent peripheral surfaces of said lateral flanges for snugly enclosing the latter, said last mentioned bores communicating with a pair of bores of relatively smaller diameter disposed axially inwardly to provide a transverse surface disposed in substantially parallel spaced relation with respect to the inner face of said cover member, said bores of smaller diameter being disposed in relative axial alignment with the bores formed in said housing; a second pair of bushing members having outer annular portions fitted in the first mentioned bores in said cover member and with their outer edges in abutment with the adjacent marginal portions of said lateral flanges, said bushings being further provided with intermediate integral lateral flange portions in abutment with the adjacent transverse surface of said cover member and disposed in substantially parallel spaced relation with respect to said lateral flanges to provide an enclosed substantially non-collapsible pump chamber, said bushings being further provided with integral inner annular portions fitted within the bores of smaller diameter in said cover member, said outer annular portions being formed with adjacent cooperating openings of relatively large size on one side of the pump chamber to permit the flow of introduced fluid into the latter, said outer annular portions being further provided with adjacent cooperating openings of relatively small size on the opposite side of the pump chamber to permit flow of the discharged fluid from the latter; a pair of pump gears rotatably disposed in said pump chamber and drivingly interconnected, said gears being provided with projections extending axially outwardly on diametrically opposite sides which are rotatably mounted in the adjacent axially aligned annular portions on said bushing members; said cover member having a fluid inlet passageway communicating with the cooperating openings of relatively large size and a fluid outlet passageway communicating with the cooperating openings of relatively small size; a drive shaft rotatably mounted in said housing and having one end drivingly connected to one of said pump gears for rotating the latter whereby fluid is drawn into said inlet opening and discharged under pressure from said outlet opening, said outlet opening being sufficiently small to reduce to a minimum any power loss resulting from high back pressures in the outlet passageway of said pump, said shaft having slight axial and angular movement independently of said gear and provided with a circumferentially extending integral flange the outer side of which is formed with a seal face; a sleeve freely disposed about said shaft and having a laterally extending flange the inner side of which is formed with a seal face engageable with the seal face on said shaft flange to provide a seal therebetween; cooperating means on said sleeve and the adjacent portion of said housing affording slight axial and angular movement of said sleeve; a flexible resilient ring encircling said sleeve and in engagement with the outer side of said sleeve flange and the adjacent relatively stationary portion of said housing, said ring being yieldable to compensate for any slight misalignment of said drive shaft without affecting the efficiency of said seal, the pressure of the fluid within the pump during operation of said pump gears urging said shaft flange into sealing engagement with said sleeve flange; and resilient means operatively associated with the end of said drive shaft and the outer end of said cover member for normally maintaining said shaft flange in sealing engagement with said sleeve flange independently of said fluid pressure.

4. A gear pump comprising, a housing having a pair of bores extending inwardly from one face thereof, said bores being spaced apart relatively and having their axes disposed in parallelism in a common transverse plane; a pair of bushing members having annular portions fitted in said bores and laterally extending integral flanges outwardly disposed in abutment with the adjacent face of said housing; a cover member removably mounted on the bushing end of said housing and having a pair of spaced bores extending inwardly from its inner face, said bores being of the same general outline as the adjacent peripheral surfaces of said lateral flanges for snugly enclosing the latter, said last mentioned bores communicating with a pair of bores of relatively smaller diameter disposed axially inwardly to provide a transverse surface disposed in substantially parallel spaced relation with respect to the inner face of said cover member, said bores of smaller diameter being disposed in relative axial alignment with the bores formed in said housing; a second pair of bushing members having outer annular portions fitted in the first mentioned bores in said cover member and with their outer edges in abutment with the adjacent marginal portions of said lateral flanges, said bushings being further provided with intermediate integral lateral flange portions in abutment with the adjacent transverse surface of said cover member and disposed in substantially parallel spaced relation with respect to said lateral flanges to provide an enclosed substantially non-collapsible pump chamber, said bushings being further provided with integral inner annular portions fitted within the bores of smaller diameter in said cover member, said outer annular portions being formed with adjacent cooperating openings of relatively large size on one side of the pump chamber to permit the flow of introduced fluid into the latter, said outer annular portions being further provided with adjacent cooperating openings of relatively small size on the opposite side of the pump chamber to permit flow of the discharged fluid from the latter; a pair of pump gears rotatably disposed in said pump chamber and drivingly interconnected, said gears being provided with projections extending axially outwardly on diametrically opposite sides which are rotatably mounted in the adjacent axially aligned annular portions on said bushing members; said cover member having a fluid inlet passageway communicating with the cooperating openings of relatively large size and a fluid outlet passageway communicating with the cooperating openings of relatively small size; a drive shaft rotatably mounted in said housing and having one end drivingly connected to one of said pump gears for rotating the latter whereby fluid is drawn into said inlet opening and discharged under pressure from said outlet opening, said outlet opening being sufficiently small to reduce to a minimum any power loss resulting from high back pressures in the outlet passageway of said pump, said shaft having slight axial and angular movement independently of said gear and provided with a circumferentially extending integral flange the outer side of which is formed with a seal face; a sleeve freely disposed about said shaft and having a laterally extending flange the inner side of which is formed with a seal face engageable with the seal face on said shaft flange to provide a seal therebetween; cooperating means on said sleeve and the adjacent portion of said housing affording slight axial and angular movement of said sleeve; a flexible resilient ring encircling said sleeve and in engagement with the outer side of said sleeve flange and the adjacent relatively stationary portion of said housing, said ring being yieldable to compensate for any slight misalignment of said drive shaft without affecting the efficiency of said seal, the pressure of the fluid within the pump during operation of said pump gears urging said shaft flange into sealing engagement with said sleeve flange; a tubular member axially disposed within the inner projection on said drive gear and provided with an extension projecting axially outwardly which is removably disposed in a bore formed in the adjacent portion of said cover member; a ball disposed in the outer end of said tubular member and prevented from accidental displacement by the constricted adjacent end portion; a coiled spring disposed within said tubular member and having one end in engagement with said ball and its opposite end in abutment with the inner end of said tubular member for normally exerting an outward pressure upon said ball; and a thrust plate mounted on the inner end of said drive shaft with which said ball frictionlessly abuts, said spring pressed ball urging said drive shaft outwardly to normally effect a seal between said shaft flange and said sleeve flange independently of the fluid pressure.

5. A gear pump comprising, a housing having a pair of bores extending inwardly from one face thereof, said bores being spaced apart relatively and having their axes disposed in parallelism in a common transverse plane; a pair of bushing members having annular portions fitted in said bores and laterally extending integral flanges outwardly disposed in abutment with the adjacent face of said housing; a cover member removably mounted on the bushing end of said housing and having a pair of spaced bores extending inwardly from its inner face, said bores being of the same general outline as the adjacent peripheral surfaces of said circular flanges for snugly enclosing the latter, said last mentioned bores communicating with a pair of bores of relatively smaller diameter disposed axially inwardly to provide a transverse surface disposed in substantially parallel spaced relation with respect to the inner face of said cover member, said bores of smaller diameter being disposed in relative axial alignment with the bores formed in said housing; a second pair of bushing members having outer annular portions fitted in the first mentioned bores in said cover member and with their outer edges in abutment with the adjacent marginal portions of said lateral flanges, said bushings being further provided with intermediate integral lateral flange portions in abutment with the adjacent transverse surface of said cover member and disposed in substantially parallel spaced relation with respect to said lateral flanges to provide an enclosed substantially non-collapsible pump chamber, said bushings being further provided with integral inner annular portions fitted within the bores of smaller diameter in said cover member, said outer annular portions being formed with a fluid inlet opening at one side thereof communicating with said pump chamber and a fluid outlet opening at the opposite side communicating with said pump chamber; a pair of pump gears rotatably disposed in the pump chamber and drivingly interconnected, said gears being provided with projections extending axially outwardly on diametrically opposite sides which are rotatably mounted in the adjacent axially aligned annular portions on said bushing members; said cover member having a fluid inlet passageway communicating with said inlet opening and a fluid outlet passageway communicating with said outlet opening; and a drive shaft rotatably mounted in said housing and having one end drivingly connected to one of said pump gears for rotating the latter whereby fluid is drawn into said inlet opening and discharged under pressure from said outlet opening.

6. In a gear pump, a housing formed with a pump chamber having a fluid inlet opening at one side of said chamber and a fluid outlet opening at the other side of said chamber; a pair of meshing gears rotatably disposed within said pump chamber; a drive shaft rotatably mounted in said housing and having one end drivingly connected to one of said meshing gears for imparting rotation thereto whereby fluid is drawn into said inlet opening and discharged under pressure from said outlet opening, said shaft having slight axial and angular movement independently of said gear and provided with a circumferentially extending integral flange the outer side of which is formed with a seal face; a sleeve freely disposed about said shaft and having a laterally extending flange the inner side of which is formed with a seal face engageable with the seal face on said shaft flange to provide a fluid pressure seal therebetween; cooperating means on said sleeve and the adjacent portion of said housing affording slight axial and angular movement of said sleeve but preventing relative rotation; and a flexible resilient ring encircling said sleeve and in engagement with the outer side of said sleeve flange and the adjacent relatively stationary portion of said housing, said ring being yieldable to compensate for any slight misalignment of said drive shaft without affecting the efficiency of said seal, the pressure of the fluid within the pump during operation of said pump gears urging said shaft flange into sealing engagement with said sleeve flange.

7. In a gear pump, a housing formed with a pump chamber having a fluid inlet opening at one side of said chamber and a fluid outlet opening at the other side of said chamber; a pair of meshing gears rotatably disposed within said pump chamber; a drive shaft rotatably mounted in said housing and having one end drivingly connected to one of said meshing gears for imparting rotation thereto whereby fluid is drawn into said inlet opening and discharged under pressure from said outlet opening, said shaft having slight axial and angular movement independently of said gear and provided with a circumferentially extending integral flange the outer side of which is formed with a seal face; a sleeve freely disposed about said shaft and having a laterally extending flange the inner side of which is formed with a seal face engageable with the seal face on said shaft flange to provide a fluid pressure seal therebetween; cooperating means on said sleeve and the adjacent portion of said housing affording slight axial and angular movement of said sleeve but preventing relative rotation; a flexible resilient ring encircling said sleeve and in engagement with the outer side of said sleeve flange and the adjacent relatively stationary portion of said housing, said ring being yieldable to compensate for any slight misalignment of said drive shaft without affecting the efficiency of said seal, the pressure of the fluid within the pump during operation of said pump gears urging said shaft flange into sealing engagement with said sleeve flange; and resilient means operatively associated with one end of said drive shaft and the adjacent end of said housing for normally maintaining said shaft flange in sealing engagement with said sleeve flange independently of said fluid pressure.

8. In a gear pump, a housing formed with a pump chamber having a fluid inlet opening at one side of said chamber and a fluid outlet opening at the other side of said chamber; a pair of meshing gears rotatably disposed within said pump chamber; a drive shaft rotatably mounted in said housing and having one end drivingly connected to one of said meshing gears for imparting rotation thereto whereby fluid is drawn into said inlet opening and discharged under pressure from said outlet opening, said shaft having slight axial and angular movement independently of said gear and provided with a circumferentially extending integral flange the outer side of which is formed with a seal face; a sleeve freely disposed about said shaft and having a laterally extending flange the inner side of which is formed with a seal face engageable with the seal face on said shaft flange to provide a fluid pressure seal therebetween; cooperating means on said sleeve and the adjacent portion of said housing affording slight axial and angular movement of said sleeve but preventing relative rotation; a flexible resilient ring encircling said sleeve and in engagement with the outer side of said sleeve flange and the adjacent relatively stationary portion of said housing, said ring being yieldable to compensate for any slight misalignment of said drive shaft without affecting the efficiency of said seal, the pressure of the fluid within the pump during operation of said pump gears urging said shaft flange into sealing engagement with said sleeve flange; a tubular member axially disposed with respect to said drive gear and provided with an extension projecting axially outwardly which is removably disposed in a bore formed in the adjacent portion of said housing; a ball disposed in the outer end of said tubular member and prevented from accidental displacement by a constricted adjacent end portion; a coil spring disposed within said tubular member and having one end in engagement with said ball and its opposite end in abutment with the inner end of said tubular member for normally exerting an outward pressure upon said ball; and a thrust plate mounted on the inner end of said drive shaft with which said ball frictionlessly abuts, said spring pressed ball exerting a force on said drive shaft to normally effect a seal between said shaft flange and said sleeve flange independently of the fluid pressure.

JAMES P. JOHNSON.